United States Patent [19]
Park

[11] Patent Number: 5,880,898
[45] Date of Patent: Mar. 9, 1999

[54] DATA REPRODUCTION METHOD AND CIRCUIT FOR REMOVING A GLITCH ERROR IN A DIGITAL MAGNETIC RECORDING/REPRODUCTION APPARATUS

[75] Inventor: Ji-hoon Park, Suwon, Rep. of Korea

[73] Assignee: Samsung Electronics Co., Ltd., Kyungki-do, Rep. of Korea

[21] Appl. No.: 613,947

[22] Filed: Mar. 13, 1996

[30] Foreign Application Priority Data

Mar. 18, 1995 [KR] Rep. of Korea ................... 1995 5708

[51] Int. Cl.⁶ ................... G11B 5/09; G11B 5/035
[52] U.S. Cl. ................... 360/51; 360/46; 360/65
[58] Field of Search ................... 360/51, 65, 46; 369/53, 54, 60

[56] References Cited

U.S. PATENT DOCUMENTS

| | | | |
|---|---|---|---|
| 4,814,740 | 3/1989 | Kobayashi | 341/118 |
| 4,965,474 | 10/1990 | Childers et al. | 307/542 |
| 5,034,744 | 7/1991 | Obinata | 341/118 |
| 5,198,710 | 3/1993 | Houston | 307/520 |
| 5,436,771 | 7/1995 | Yun | 360/65 |
| 5,490,127 | 2/1996 | Ohta et al. | 369/54 |
| 5,523,896 | 6/1996 | Park | 360/51 |

FOREIGN PATENT DOCUMENTS

| | | | |
|---|---|---|---|
| 358105067A | 6/1983 | Japan | G01R 13/20 |
| 363222372A | 9/1988 | Japan | G11B 20/10 |
| 401076469A | 3/1989 | Japan | G11B 121/08 |

*Primary Examiner*—Nabil Hindi
*Assistant Examiner*—Regina Y. Neal
*Attorney, Agent, or Firm*—Sughrue, Mion, Zinn, Macpeak & Seas, PLLC

[57] ABSTRACT

A data reproduction method and a circuit therefor for use in a digital magnetic recording/reproduction apparatus. The circuit includes a reproduction amplifier, a reproduction equalizer, a data detector, a reproduced clock recovery portion, a data/clock synchronizer, and a glitch error removal portion. The method and apparatus operates to remove a glitch error which may occur when the digital data recorded on the recording medium is recovered. The data from which the glitch error has been removed is synchronized with a reproduced clock. Removal of the glitch error prevents misoperation of the devices which perform subsequent operations, and improves the bit error ratio of the overall reproduction system.

4 Claims, 5 Drawing Sheets

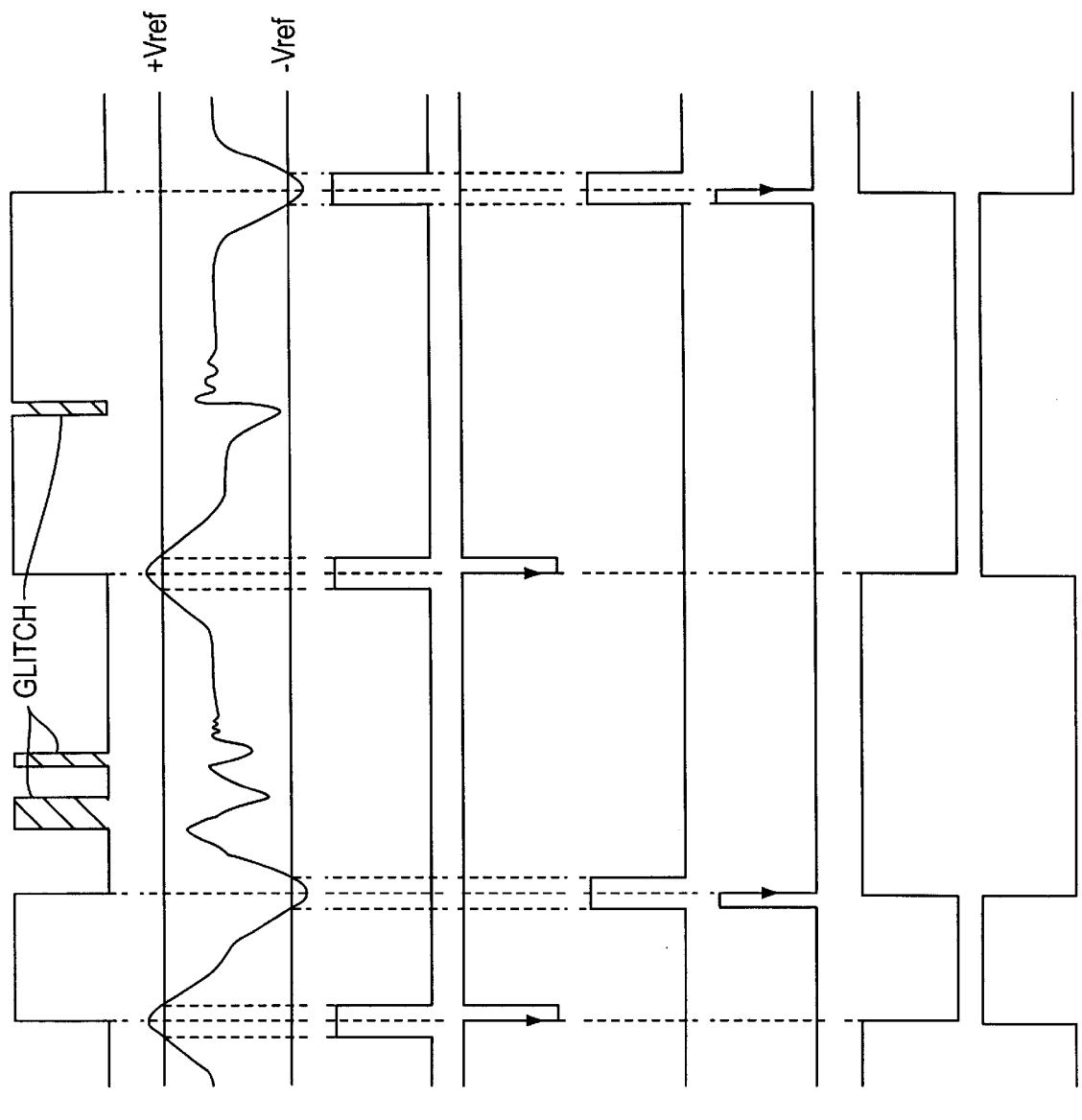

DATA REPRODUCTION METHOD AND CIRCUIT FOR REMOVING A GLITCH ERROR IN A DIGITAL MAGNETIC RECORDING/REPRODUCTION APPARATUS

BACKGROUND OF THE INVENTION

The present invention relates to a data reproduction method, and a circuit therefor, for use in a digital magnetic recording/reproduction apparatus, and more particularly, to a data reproduction method, and a circuit therefor, for faithfully reproducing digital data from a recording medium by removing a glitch error which may occur when the digital data recorded on the recording medium is recovered, before the recovered digital data is synchronized with a reproduced clock.

FIG. 1 is a block diagram showing a conventional data reproduction circuit in a digital magnetic recording/reproduction apparatus. As shown in FIG. 1, digital data which is reproduced from a recording medium via a reproducing head (not shown) is amplified to a predetermined level by a reproduction amplifier 1 and is then applied to a reproduction equalizer 2. Reproduction equalizer 2 corrects the waveform output by the reproduction amplifier 1 so as to easily convert the output signal from reproduction amplifier 1 (i.e., a reproduced digital data signal closely related to an analog signal) into the original digital data, and then outputs the result to a data detector 3.

Data detector 3 recovers the reproduced digital data from the output signal of reproduction equalizer 2 and then outputs the recovered digital data to a data/clock synchronizer 5. A reproduced clock recovery portion 4 recovers a reproduced clock from the output signal of reproduction equalizer 2 and then outputs the recovered clock to data/clock synchronizer 5. Data/clock synchronizer 5 synchronizes the reproduced digital data with the reproduced clock and then outputs the result.

Generally, when the digital data recorded on a magnetic recording medium is reproduced by a digital magnetic recording/reproduction apparatus, the reproduced digital data has analog signal characteristics due to the analog-like characteristics and differentiation characteristics of the magnetic recording medium itself.

However, when the reproduced digital data having analog characteristics is recovered into the original digital data by the conventional data reproduction circuit, an undesired component may occur due to the external noise or the excessive high frequency band emphasis characteristic of the reproduction equalizer. The undesired component, i.e., the glitch, is shown in the form of sharp digital data which is much shorter than a minimum run length determined by the highest frequency component among the detected digital data. Here, problems which may occur when the digital data including the glitch component is synchronized with the reproduced clock without elimination of the glitch component are shown in FIGS. 2A to 2C.

As shown in FIGS. 2A to 2C, it is assumed that the data are synchronized with the clock at a rising edge of the reproduced clock (see FIG. 2A). That is, the data status at the current rising edge of the reproduced clock (see FIG. 2A) is continuously maintained at the next rising edge. As shown in FIG. 2B, glitches #1 and #3 are not detected as errors because they do not overlap the rising edges of the reproduced clock shown in FIG. 2A. However, glitches #2 and #4 overlap the rising edges of the reproduced clock (see FIG. 2A), and are therefore detected as errors at the output (see FIG. 2C) of data/clock synchronizer 5.

SUMMARY OF THE INVENTION

To overcome the above problem, it is an object of the present invention to provide a data reproduction method for faithfully reproducing digital data from a recording medium by removing a glitch error which may occur when the digital data recorded on the recording medium is recovered, before synchronization with a reproduced clock.

It is another object of the present invention to provide a circuit which is suitable for the above data reproducing method.

To achieve the first object, there is provided a data reproduction method in a digital magnetic recording/reproduction apparatus comprising the steps of: (a) detecting original digital data from digital data reproduced from a recording medium via a reproduction head; (b) recovering a reproduced clock from the digital data reproduced from the recording medium; (c) removing a glitch error included in the original digital data detected during the step (a); and (d) synchronizing the digital data from which the glitch error is removed in the step (c) with the reproduced clock and outputting the result.

To achieve the second object, there is provided a data reproduction circuit of a digital magnetic recording/reproduction apparatus comprising: a reproduction amplifier for amplifying digital data reproduced from a recording medium via a reproduction head into a predetermined level; a reproduction equalizer for correcting a waveform so as to easily convert the reproduced digital data output from the reproduction amplifier into original digital data; a data detector for detecting the original digital data from the digital data output from the reproduction equalizer; a reproduced clock recovery portion for recovering a reproduced clock in the digital data output from the reproduction equalizer; a glitch error removal portion for removing a glitch error included in the original digital data detected by the data detector; and a data/clock synchronizer for synchronizing the digital data from which the glitch error is removed by the glitch error removal portion with the reproduced clock and outputting the result.

BRIEF DESCRIPTION OF THE DRAWINGS

The above objects and advantages of the present invention will become more apparent by describing in detail a preferred embodiment thereof with reference to the attached drawings in which:

FIGS. 5A to 5H show operational waveforms of respective portions of the data reproduction circuit shown in FIG. 4 when glitch errors occur.

DETAILED DESCRIPTION OF THE INVENTION

Figure 1:
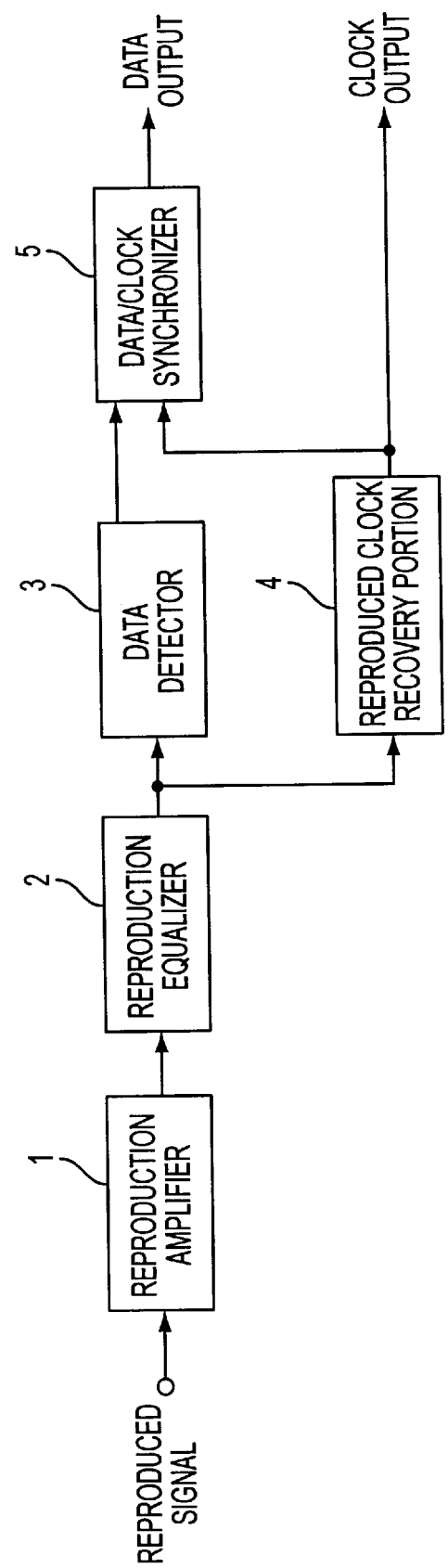
FIG. 1 is a block diagram showing a conventional data reproduction circuit in a digital magnetic recording/reproduction apparatus.
Figure 2:
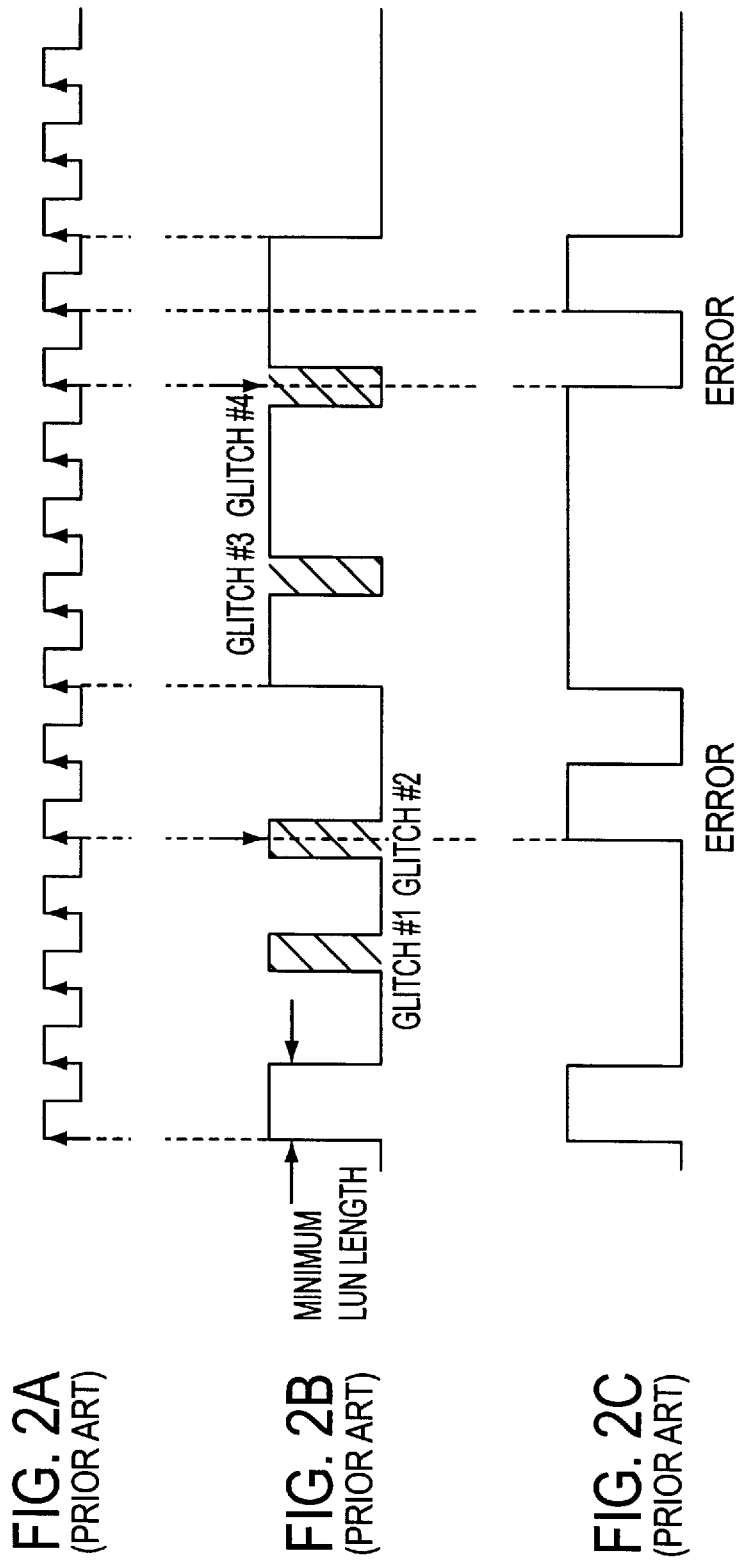
FIGS. 2A to 2C show operational waveforms of respective portions of the data reproduction circuit shown in FIG. 1 when glitch errors occur.
Figure 3:
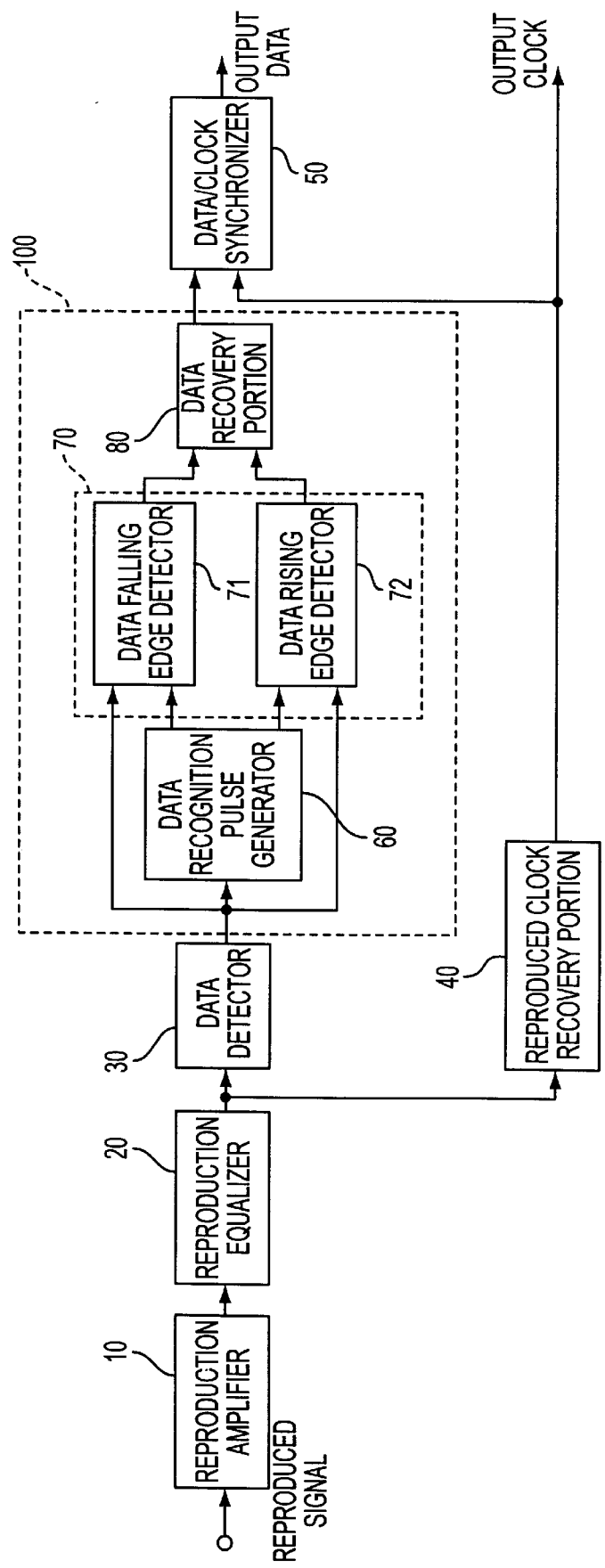
FIG. 3 is a block diagram of a data reproduction circuit in a digital magnetic recording/reproduction apparatus according to the present invention.

The data reproduction circuit shown in FIG. 3 includes a reproduction amplifier 10 for amplifying the digital data reproduced from a recording medium via a reproduction head (not shown), a reproduction equalizer 20 for correcting a waveform so as to easily convert the output signal from reproduction amplifier 10, which is closely related to an analog signal, into the original digital data, a data detector 30 for recovering the reproduced digital data from the output signal of reproduction equalizer 20, a reproduced clock recovery portion 40 for recovering a reproduced clock from the output signal of reproduction equalizer 20, a data/clock synchronizer 50 for synchronizing the reproduced digital data with the reproduced clock and outputting the result, and a glitch error removal portion 100 coupled between data detector 30 and data/clock synchronizer 50 for removing the glitch error included in the digital data recovered by data detector 30.

Also, glitch error removal portion 100 includes a data recognition pulse generator 60 for generating a pulse at each edge section of pure data excluding the glitch included in the digital data output from data detector 30 (i.e., for generating a pulse only at each transition section), a data edge detector 70 for detecting the edge of the pure data using the digital data including the glitch output from data detector 30 and the pulse signal output from data recognition pulse generator 60, and a data recovery portion 80 for combining the output signals from data edge detector 70 to recover the pure data without the glitch. Also, data edge detector 70 has a data falling edge detector 71 and a data rising edge detector 72.

Figure 4:
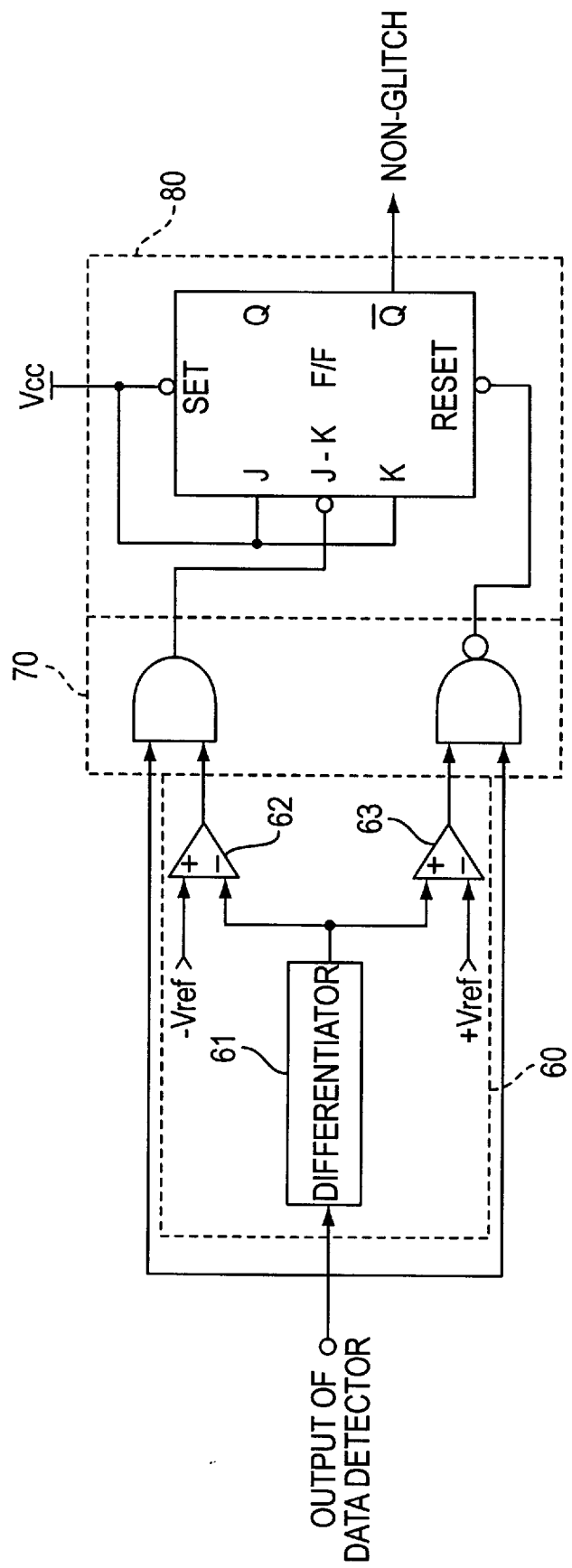
FIG. 4 is a detailed circuit diagram of the glitch error removal portion of FIG. 3.

FIG. 4 is a detailed circuit diagram of glitch error removal portion 100 of FIG. 3.

As shown in FIG. 4, data recognition pulse generator 60 includes a differentiator 61 for differentiating the digital data detected by data detector 30, a first comparator 62 for generating a first rectangular wave by comparing the output signal of differentiator 61 with a first reference voltage $-V_{ref}$, and a second comparator 63 for generating a second rectangular wave by comparing the output signal of differentiator 61 with a second reference voltage $+V_{ref}$.

Also, in data edge detector 70, data falling edge detector 71 includes an AND gate for performing an AND operation with respect to the outputs of data detector 30 and first comparator 62, and data rising edge detector 72 includes a NAND gate for performing a NAND operation with respect to the outputs of data detector 30 and second comparator 63.

Also, data recovery portion 80, which has J-K flip-flop (J-K F/F), receives the output of the AND gate via an inverted clock port as an inverted clock signal, receives the output of the NAND gate via an inverted reset port as an inverted reset signal, and receives a high-level signal via J and K input ports and an inverted set port.

FIGS. 5A to 5H are operational waveforms of the respective portions of the data reproducing circuit shown in FIG. 4 when glitch errors occur. FIG. 5A represents the digital data detected by data detector 30, FIG. 5B represents the output signal of differentiator 61, FIG. 5C represents the output signal of second comparator 63, FIG. 5D represents the output signal of the NAND gate, FIG. 5E represents the output signal of first comparator 62, FIG. 5F represents the output signal of the AND gate, FIG. 5G represents the output signal from a Q terminal of J-K F/F, and FIG. 5H represents the output signal from a $\overline{Q}$ terminal of J-K F/F.

Hereinafter, the operation of the data reproduction circuit according to the present invention will be described with reference to FIGS. 3, 4, and 5A to 5H.

As shown in FIG. 5A, the digital data which passes through reproduction amplifier 10, reproduction equalizer 20 and data detector 30, after being reproduced from the magnetic recording medium, has glitch errors. Each of the glitch errors is a pulse narrow in width and acute in shape, and exists due to the internal or external noise of the apparatus.

The digital data (see FIG. 5A) output from data detector 30 is differentiated by differentiator 61 of data recognition pulse generator 60 and outputs the signal as shown in FIG. 5B. Here, the output data (see FIG. 5B) from differentiator 61 shows the differentiation characteristic in that the waveform goes upwards or downwards at the edge sections which correspond to the inverted sections of the digital data (see FIG. 5A) output from data detector 30. In this case, if an optimum differentiation time constant is set, the width of the differentiated signal is much smaller at a section having a narrow pulse width, as in a glitch, than at other sections.

Accordingly, first and second comparators 62 and 63 compare the output signal (see FIG. 5B) with first and second reference voltages $-V_{ref}$ and $+V_{ref}$ each having a predetermined amplitude, respectively, and then detect a signal section having amplitude not larger than first reference voltage $-V_{ref}$ and a signal section having amplitude not smaller than second reference voltage $+V_{ref}$ among the output signal of differentiator 61 to output the result in the form of rectangular waves (see FIGS. 5E and 5C). That is, in FIG. 5C, only a section in which the rising edge of the pure data excluding the glitch from the output signal (FIG. 5B) of differentiator 61, is detected, and in FIG. 5E, only a section in which the falling edge of the pure data excluding the glitch from the output signal (FIG. 5B) of differentiator 61 is detected.

The AND gate operates as data falling edge detector 71 and performs an AND operation with respect to the output signal (FIG. 5E) of first comparator 62 and the output (FIG. 5A) of data detector 30 to output the signal as shown in FIG. 5F. The NAND gate operates as data rising edge detector 72 and performs a NAND operation with respect to the output signal (FIG. 5C) of second comparator 63 and the output (FIG. 5A) of data detector 30 to output the signal as shown in FIG. 5D. Here, each falling edge of FIG. 5D corresponds to the rising edge in the pure data section of the digital data (FIG. 5A) output from data detector 30, and each rising edge of FIG. 5F corresponds to the falling edge in the pure data section of digital data (FIG. 5A) output from data detector 30.

In the J-K flip-flop (J-K F/F) of data recovery portion 80, the output (FIG. 5D) of the NAND gate and the output of the AND gate are applied to the inverted reset port (RESET) and to the inverted clock port (CK), respectively. Thereafter, the J-K flip-flop (J-K F/F) is put into a toggle state by applying highlevel logic signals to the J, K and inverted set ports, so that the data in which glitches are eliminated can be recovered at output port $\overline{Q}$.

By using the data reproducing method and circuit described above in a digital magnetic recording/reproduction apparatus, a glitch error which may occur when recovering the digital data recorded on the recording medium is removed before synchronization with a reproduced clock, so that misoperation of the devices which perform subsequent operations can be prevented, and a bit error ratio for the entire reproducing system can be improved.

What is claimed is:

1. A data reproduction method of a digital magnetic recording/reproduction apparatus, the method comprising the steps of:

(a) detecting original data from digital data reproduced from a recording medium via a reproduction head;

(b) recovering a reproduced clock from the digital data reproduced from said recording medium;

(c) removing a plurality of glitch errors included in the original digital data detected during said step (a); and (d) synchronizing the digital data from which the glitch error is removed in said step (c) with the reproduced clock and then outputting the result;

wherein said removing step comprises:

(c-1) generating a pulse at each edge of pure data excluding the glitch error included in the digital data detected in said step (a), thereby producing a pulse signal;

(c-2) detecting edges of the pure data from the digital data including the glitch errors detected in said step (a) and the pulse signal produced in said step (c-1) and outputting respective signals; and (c-3) combining the respective signals output in said step (c-2) to recover the sure data with no glitch errors from the combined signal; and wherein said step (c-1) comprises:

(c-1') differentiating the digital data detected in said step (a) and outputting a differentiated signal having a width of the differentiated signal which is narrower when one of said glitch errors is differentiated than when one of said digital data is differentiated;

(c-2') comparing the differentiated signal output in said step (c-1') with a first reference voltage $-V_{ref}$ to generate a first rectangular wave with respect to a signal section in which the amplitude of the differentiated signal output in said step (c-1') is not larger than said first reference voltage $-V_{ref}$; and comparing the differentiated signal output in said step (c-1') with a second reference voltage $+V_{ref}$ to generate a second rectangular wave with respect to a signal section in which the amplitude of the differentiated signal output in said step (c-1') is not smaller than second reference voltage $+V_{ref}$.

2. A data reproduction circuit of a digital magnetic recording/reproduction apparatus comprising:

a reproduction amplifier for amplifying digital data reproduced from a recording medium via a reproduction head to a predetermined level, and outputting the resulting waveform;

a reproduction equalizer for correcting the waveform output by said reproduction amplifier so as to convert the reproduced digital data output from said reproduction amplifier into digital data including original digital data and a reproduced clock;

a data detector for detecting the original digital data from the digital data output from said reproduction equalizer;

a reproduced clock recovery portion for recovering a reproduced clock from the digital data output from said reproduction equalizer;

a glitch error removal portion for removing a plurality of glitch errors included in the original digital data detected by said data detector; and a data/clock synchronizer for synchronizing the digital data from which the glitch error is removed by said glitch error removal portion with the reproduced clock and outputting the result;

wherein said glitch error removal portion comprises:

a data recognition pulse generator for generating a pulse at each edge of pure data excluding the glitch error included in the digital data detected by said data detector, thereby producing a pulse signal;

a data edge detector for detecting edges of the pure data from the digital data including the glitch error output from said data detector and the pulse signal output from said data recognition pulse generator and outputting respective signals; and a data recovery portion for combining the respective signals output from said data edge detector to recover the pure data with no glitch error from the combined signal; and wherein said data recognition pulse generator comprises:

a differentiator for differentiating the digital data detected by said data detector and outputting a differentiated signal, said differentiator having a time constant which causes a width of the differentiated signal to be narrower when one of said glitch errors is differentiated than when one of said digital data is differentiated;

a first comparator for comparing the output of said differentiator with a first reference voltage $-V_{ref}$ to generate a first rectangular wave with respect to a signal section in which the amplitude of the output signal of said differentiator is not larger than said first reference voltage $-V_{ref}$; and a second comparator for comparing the output signal of said differentiator with a second reference voltage $+V_{ref}$ to generate a second rectangular wave with respect to a signal section in which the amplitude of the output signal of said differentiator is not smaller than second reference voltage $+V_{ref}$.

3. A data reproduction circuit as claimed in claim 2, wherein said data edge detector comprises:

an AND gate for performing an AND operation with respect to the outputs of said data detector and said first comparator so as to detect a falling edge of the digital data detected by said data detector; and a NAND gate for performing a NAND operation with respect to the outputs of said data detector and said second comparator so as to detect a rising edge of the digital data detected by said data detector.

4. A data reproduction circuit as claimed in claim 3, wherein said data recovering portion comprises a J–K flip-flop to which the output of said AND gate is applied as an inverted clock signal, the output of said NAND gate is applied as an inverted reset signal, and high-level logic signals are applied as J, K and inverted set signals.

* * * * *